United States Patent [19]
Fishman et al.

[11] 3,943,188

[45] Mar. 9, 1976

[54] FIRE RESISTANT VINYL RESIN WITH METAL SALT OF PHENOLIC RESIN

[75] Inventors: Norman Fishman, Menlo Park; Dean B. Parkinson, Redwood City, both of Calif.

[73] Assignee: Stanford Research Institute, Menlo Park, Calif.

[22] Filed: Oct. 15, 1973

[21] Appl. No.: 406,476

[52] U.S. Cl. .... 260/847; 260/45.75 C; 260/45.75 Z
[51] Int. Cl.$^2$ ........................................ C08L 27/00
[58] Field of Search ...................... 260/847, 45.75 C

[56] References Cited
UNITED STATES PATENTS

| | | | |
|---|---|---|---|
| 2,438,097 | 3/1948 | Rogers et al. | 260/847 |
| 2,659,708 | 11/1953 | Berger et al. | 260/847 |
| 2,917,481 | 12/1959 | Masters | 260/847 |
| 3,137,666 | 6/1964 | Lox et al. | 260/847 |
| 3,151,097 | 9/1964 | Conger | 260/847 |
| 3,245,943 | 4/1966 | Barnes et al. | 260/847 |
| 3,697,459 | 10/1972 | Dannels et al. | 260/847 |

*Primary Examiner*—Murray Tillman
*Assistant Examiner*—Arthur H. Koeckert
*Attorney, Agent, or Firm*—Edward B. Gregg

[57] ABSTRACT

Vinyl halide resin compositions having improved fire resistance are formed by the introduction into said compositions of a small amount of a reactive hydroxy group-containing polyvalent metal salt of a phenol-aldehyde resin of the novolac type. The resulting vinyl halide resins evidence increase charring of the surface when exposed to heating by a flame or undergoing combustion, the surface char acting as a barrier to heat transfer from the flame and retarding the flow of volatile gases from the pyrolyzing resin.

10 Claims, No Drawings

FIRE RESISTANT VINYL RESIN WITH METAL SALT OF PHENOLIC RESIN

BACKGROUND OF INVENTION

Vinyl halide resin compositions are widely used as packaging films, sheeting, hose and tubing, coatings, wire insulations, business machine and appliance parts and housings, synthetic textile garments and materials of construction, among other applications. It is, therefore, of considerable importance that such materials have good fire resistance. While polyvinyl chloride, vinyl chloride copolymers and vinylidene chloride homopolymers and copolymers do not readily burn under ordinary circumstances, they release toxic hydrochloric acid fumes when subjected to strong heat, and if after ignition the burning material continues to be exposed to the flames it can be consumed in the resultant combustion process. Other vinyl halide resins such as polyvinylbromide and polyvinylfloride similarly release toxic hydrogen halide fumes and can also be consumed by combustion in the presence of flames.

Vinyl halide resins are normally compounded with other materials that flexibilize, toughen, or stabilize them against degradation by heat and ultraviolet light. However, the use of such additives frequently increases the combustibility of the resins. This is true, for example, when adding plasticizers such as dioctyl phthalate or dioctyl adipate which impart enhanced flexibility, as well as when adding impact modifiers such as acrylonitrile butadiene styrene terpolymers.

Vinyl halide compositions have heretofore been rendered somewhat less combustible by incorporating therein materials such as phosphate ester plasticizers, antimony oxide, and phosphites or tin-containing stabilizers. However, these additives do not alleviate the problem of smoke generation which is in part attributable to the evolution of gases that burn with very smoky flames as well as to the release of toxic hydrohalide acid fumes. Further, such additives do not appreciably alleviate the problem of combustion of the polymer composition on being exposed to a flame.

It is an object of this invention to provide novel, fully compounded vinyl halide resin compositions which have improved fire resistance and which are free of many of the disadvantages associated with the use of previously available systems as they are subjected to combustion conditions. A more particular object is to provide a vinyl halide resin having a composition such that increased charring of the surface of the resin will occur when the said surface is subjected to heat by a flame. The nature of still other objects of the invention will be apparent from a consideration of the descriptive portion to follow.

SUMMARY OF THE INVENTION

The present invention is based on the discovery that the foregoing and other objects of the invention can be attained by the provision of a vinyl halide resin composition in which a relatively small proportion of a reactive hydroxy group-containing polyvalent metal salt of a phenol-aldehyde resin has been uniformly introduced. It has been found that the introduction of said salt into the vinyl halide resin composition enhances char formation greatly improves the fire resistance of the said composition when the latter is subjected to heating by a flame or is undergoing combustion. This generation of a protective char layer is an effective means for achieving increased resistance to fire because less fuel is formed, the char forms a barrier to heat transfer into the resin composition and retards the flow of volatiles therefrom.

The hydroxy group-containing salts employed in a practice of the present invention contain reactive hydroxyl groups and are those formed from a polyvalent metal and an excess of a phenol-aldehyde resin. Preferred salts for use herein are the zinc, cupric, stannic, barium, and ferric salts of phenol-aldehyde resin, through other polyvalent metals, the salts of which with said phenol-aldehyde resin prove to be effective in imparting fire resistance to vinyl halide resins compositions may be employed, particularly those polyvalent metals found in groups II, IV and VIII of the Periodic Table.

These salts can be prepared in known fashion by reacting a suitable salt (e.g. chloride, acetate or the like) or alcoholate of the polyvalent metal with an excess of the phenolic reactant, said excess being at least about 50 percent above the amount theoretically required to satisfy all of the metal valencies with —OH groups. This reaction, involving replacement of the hydrogen atom of a portion of the phenolic —OH groups by a metal valency, is one of metathesis which proceeds readily when the reactants are heated together either neat or in the presence of a suitable solvent. The by-product acid or alcohol formed during the reaction can then be distilled from the mixture, usually at reduced pressures, when the reaction is complete.

The term "phenol-aldehyde resin" is employed herein to designate those cmpounds having the structure

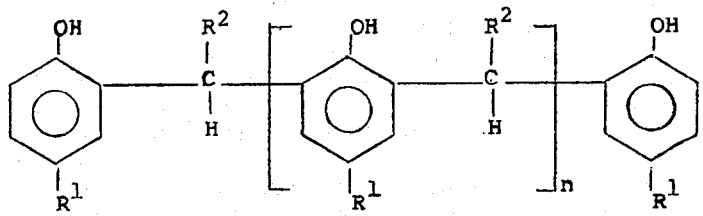

wherein $n$ is a small number having an average value of from about 1 to 4, wherein the symbol $R^1$ represents hydrogen, halogen (Cl, Br or I), or alkyl (including cycloalkyl) groups, preferably $C_1 - C_5$ alkyl such as methyl, ethyl, propyl, iso-propyl, butyl, sec-butyl, tert-butyl, amyl and cyclopentyl, and wherein $R^2$ represents hydrogen or a $C_1 - C_3$ alkyl group such as methyl, ethyl, propyl or isopropyl. These phenolaldehyde resins, which are of the so-called "novolac" type, can readily be prepared by the reaction of less than 1 mole of an aldehyde reactant with each mole of phenolic compound employed, the reaction being carried out in the presence of an acid catalyst to form condensation products containing reactive phenolic hydroxyl groups. Said products have the condensation carried to a stage where the material is still soluble in organic solvents, fusable, and capable of further reaction through the reactive hydroxyl groups.

The term "vinyl halide resin compositions", as employed herein, is intended to mean those compositions containing a vinyl halide homopolymer or copolymer as the principal polymeric ingredient. It includes vinyl halide homopolymers such as polyvinyl chloride, polyvinyl bromide, polyvinyl fluoride, polyvinylidene chloride, and polyvinylidene fluoride as well as copolymers such as those formed by the polymerization of a mixture of a vinyl halide with at least one other polymerizable mono-olefin such as vinyl acetate, vinyl propionate, vinyl butyrate, vinyl stearate, vinylidene chloride, styrene, methyl methacrylate, dialkyl fumarate or maleate and the like. The vinyl halide used is ordinarily and preferably the chloride, but the bromide and fluoride may also be used. The copolymers useful in the practice of this invention are those containing at least 70% of a vinyl halide and up to 30% of the other polymerizable mono-olefinic compound. Additionally, the vinyl halide resin composition may include any of the usual plasticizers for vinyl halide resins, such, for example, as dioctyl phthalate, dioctyl adipate, tricresyl phosphate, and the like. The plasticizer is generally present in the amount of about 5 to 100 parts per 100 parts of the resin. Heat and light stabilizers, lubricants, pigments, fillers, extenders, solvents, and the like may also be used in preparing the fire retardant resinous compositions.

The amounts of the aforesaid salts of polyvalent metals with phenol-aldehyde resins to be employed in the vinyl halide resin composition in carrying out the fire retardance of the present invention will vary from one salt and resin composition to another. However, in general, said salt additives will be employed in amounts which are effective to provide the fully compounded vinyl halide resin composition with good char forming and other desired fire resistance characteristics. While said amounts of the additives to be used can readily be determined for a given resin system by routine methods, good results can be obtained with a wide variety of polyvalent metal salts and vinyl halide resin compositions by employing vinyl halide resin compositions containing a total of from about 1 to 10 percent, in terms of the weight of the vinyl halide resin component of the composition, of the polyvalent metal salt. Amounts of the salt less than 1 percent have a reduced effect insofar as imparting fire resistance to the composition is concerned, while the use of the salt in amounts significantly larger than 10 percent appears to be without any benefit over and above that obtained with the lesser amount.

In one method of preparing the salt-containing vinyl halide resin compositions of this invention, the vinyl halide homopolymer or copolymer is first blended with the fire-retardant salt and the various plasticizers, stabilizers, pigments and the like to be employed. This composition is then milled on rolls at temperatures of from about 200° to 350° F. until a homogenous product is obtained. This product can then be calendered to a sheet or film. Alternatively the mixture can be slush-molded, extruded, or milled and then compression-molded to form a variety of products. Still other methods will suggest themselves to those skilled in the art.

Numerous examples are given below wherein one or another of the hydroxy group-containing, polyvalent metal salts are incorporated in vinyl halide resin compositions which are then pressed into 0.10 inch sheets for test in two procedures. At the same time, "controls" were run having the same composition, but without the addition of said salts. In one of these tests, for which data is given in the table provided with examples 1 – 4, char formation and weight loss were determined in a procedure (the so-called Propane Torch Test) wherein samples were sandwiched between two thin plates of stainless steel each with a ¾ inch diameter hole in the center. The sample was held vertically and the torch flame was brought to bear along an axis perpendicular to the sample face. The visible blue flame of the torch was 1 inch in length, and the burner tip was held 3 inches from the sample face; the flame was impinged on the sample surface for a period of 20 seconds. Weight loss was recorded after each sample was exposed to the flame, and such observations as melting and charring were noted. This Propane Torch Test simulates the effects of a high intensity fire. As the other test, the National Bureau of Standards Smoke Chamber Method was employed to determine smoke obscuration effects and the charring that occurs under radiant heat exposure. In this test, with respect to which data are also given in the table presented with each of the examples, $D_s$ is the specific optical density occurring in the chamber, $D_m$ is the maximum specific optical density, $T_m$ is the time in minutes when this occurs, and $T_{16}$ is the time in minutes required to reach a critical smoke density at which $D_s = 16$ (also equivalent to a 16% transmission over a viewing distance of 10 ft in a 12.5 × 20 × 8 ft room assuring that a 16% transmission is critical). These smoke chamber tests were conducted under flaming conditions with the sustaining flame impinging on the sample during the entire test.

DESCRIPTION OF PREFERRED EMBODIMENTS

The following examples are set forth to show the unique fire retardant properties of increased char formation and lessened smoke generation caused by the employment of the polyvalent metal salts of phenol-aldehyde resins in vinyl halide resin compositions.

EXAMPLE 1

A zinc phenolate salt containing active —OH groups was prepared by reacting a phenolic resin with zinc acetate in a 3/1 mole ratio, this representing approximately a 300% excess of said resin. More specifically, 192.6 grams of BRZ 7541, a phenol-aldehyde resin manufactured by Union Carbide Corporation, was heated to a molten state (50° C.) in a 500 ml, 3-neck, round bottom flask. 43.9 grams of zinc acetate [$Zn(C_2H_3O_2)_2·2H_2O$] was slowly added to the molten resin, and then the mixture was heated slowly to 180° C. Evolution of acetic acid and water of hydration became profuse above 100° C., and vacuum was applied to remove these reaction products. Heating was continued for about 45 minutes. The zinc phenolate product was an amber, brittle, resinous solid. Said BRZ 7541 has the structure indicated above, where the $R^1$ and $R^2$ groups are hydrogen, and where $n$ has an average value slightly in excess of 1, the molecular weight of the resin being 321.

This additive was incorporated with other modifying ingredients (indicated below in Table I) into polyvinyl chloride (PVC resin Geon 101-Ep of B. F. Goodrich Chemical Company) by blending at 58° C., milling at 150° C., and pressing into 0.10 inch sheets at 175° C. The results of the Propane Torch and NBS Smoke Chamber Tests are presented below in Table I.

TABLE I

|  | A | B | C | D | E | F | G | H | I |
|---|---|---|---|---|---|---|---|---|---|
| PVC resin (1) | 100 | 100 | 100 | 100 | 60 | 60 | 60 | 60 | 60 |
| Stabilizer (2) | — | 2 | 2 | 2 | — | 2 | — | 2 | 2 |
| Plasticizer (3) | — | — | — | — | 40 | 40 | 40 | 40 | 40 |
| Zinc Phenolate | — | — | 1 | 5 | — | — | 2 | 1 | 5 |
| Propane Torch Test | | | | | | | | | |
| Wt. loss g. | 0.36 | 0.34 | 0.36 | 0.36 | 0.51 | 0.34 | 0.31 | 0.39 | 0.24 |
| Char formation | Porous char | Porous char | Firm char | Firm char | Melted | Melted | Firm char | Firm char | Firm char |
| NBS Smoke Chamber Test | | | | | | | | | |
| Wt. loss, % | 60 | 80 | 43 | — | 100 | 83 | 79 | 81 | 75 |
| $T_{16}$ | 0.50 | 0.55 | 0.58 | — | 0.28 | 0.24 | 0.15 | 0.25 | 0.20 |
| $T_m$ | 4.15 | 7.3 | 5.7 | — | 1.85 | 2.7 | 2.4 | 2.3 | 2.6 |
| $D_m$ | 590 | 580 | 485 | — | >800 | >800 | 635 | 660 | 700 |
| Char formation | Firm char | Firm char | Flaky char | — | None | Flaky char | Firm char | Firm char | Firm char |

1. Geon 101-Ep from B. F. Goodrich Chemical Company
2. Ferro 5469 from Ferro Corporation, a Ba, Cd, Organic Inhibitor-Stabilizer
3. Dioctyl phthalate This example shows the effectiveness of zinc phenolates in forming firm chars, with resultant lower weight loss and suppression of smoke formation for both plasticized and non-plasticized PVC-based resin formulations. Thus, it will be noted that the non-plasticized PVC formulations C and D, which contain 1 and 5 phr (parts per hundred of resin) Zn phenolate, respectively, form firm chars by the Propane Torch Test whereas the control samples A and B form porous chars. Formulation C performs better in the NBS Smoke Chamber Test than the corresponding control sample A giving a longer time to yield maximum smoke density ($T_m$) and showing a lower weight loss. Sample D was not tested by this method. The plasticized samples G, H, and I, which contain 2, 1, and 5 phr Zn phenolate, respectively, form firm chars in the Propane Torch Test whereas the corresponding control samples E and F melt. Likewise, for the higher amount of zinc phenolate, samples G and I, lower weight losses are given by this test. The NBS Test shows that the zinc phenolate-containing samples G, H, and I give lower weight losses, form firmer chars and take longer times to yield maximum smoke density ($T_m$) as compared to the control samples E and F. In fact, control sample E is consumed entirely by fire in this test.

EXAMPLE 2

A copper (II) phenolate (i.e., a cupric phenolate) was prepared by reacting a phenolic resin with copper nitrate [Cu(NO$_3$)$_2$·3H$_2$O] in a 3/1 mole ratio. In a manner similar to that of Example 1, 48.3 grams of copper nitrate was added to 192.6 grams of molten BRZ 7541 at 50° C. Reaction was immediate, and vacuum was applied to remove water of hydration, HNO$_3$, and N-oxides, as the mixture was heated to 150° C. over a 30-minute period. The copper phenolate product was a black, brittle, resinous solid. This additive was incorporated with other modifying ingredients into polyvinyl chloride and formed into 0.10 inch sheets as described in Example 1. The results of the Propane Torch and NBS Smoke Chamber Tests were as follows:

TABLE II

|  | A | B | C | D | E | F | G | H |
|---|---|---|---|---|---|---|---|---|
| PVC resin (1) | 100 | 100 | 100 | 100 | 100 | 60 | 60 | 60 |
| Stabilizer (2) | — | 2 | 2 | 2 | — | 2 | 2 | 2 |
| Plasticizer (3) | — | — | — | — | — | 40 | 40 | 40 |
| Cu(II) phenolate | — | — | 1 | 5 | 5 | — | 1 | 5 |
| Propane Torch Test | | | | | | | | |
| Wt. loss g | 0.36 | 0.34 | 0.28 | 0.30 | 0.28 | 0.34 | 0.31 | 0.35 |
| Char formation | porous char | porous char | flaky char | firm char | flaky char | melted | firm char | firm char |
| NBS Smoke Chamber test | | | | | | | | |
| Wt. loss % | 60 | 80 | 43 | — | — | 83 | 82 | 76 |
| $T_{16}$ | 0.50 | 0.55 | 0.75 | — | — | 0.24 | 0.22 | 0.22 |
| $T_m$ | 4.15 | 7.3 | 6.4 | — | — | 2.7 | 2.05 | 3.35 |
| $D_m$ | 590 | 580 | 480 | — | — | >800 | >800 | >800 |
| Char formation | Firm char | Firm char | Firm char | — | — | Flaky char | Flaky char | Flaky char |

For Footnotes, see TABLE I

This example shows the effectiveness of copper (II) phenolates in forming firm chars with resultant lower weight loss and in suppressing smoke formation, especially for non-plasticized and to some extent for plasticized PVC resin formulations. The results from the Propane Torch Test as tabulated above show that non-plasticized PVC samples C, D, and E, containing 1.5 and 5 phr Cu (II) phenolate, respectively, gave lower weight losses and formed firmer chars than the corresponding control samples A and B. Sample C also gave a lower weight loss than control sample A. It also gave a higher $T_m$ with a lower maximum smoke density ($D_m$) in the NBS Smoke Chamber Test. The plasticized samples G and H, which contained 1 and 5 phr Cu phenolate, respectively, formed firm chars in the Propane Torch Test whereas the control sample F melted. Sample H, with larger amounts of Cu phenolate, showed lower weight loss and higher $T_m$ values as compared to control sample F in the NBS Smoke Chamber Test.

EXAMPLE 3

A barium phenolate was prepared by reacting a phenolic resin with barium methoxide [Ba(OCH₃)₂] in a 3/1 mole ratio. In a manner similar to that of Example 1, 10 grams of barium methoxide and 48.1 grams of BRZ 7541 were combined and heated to 170°–180° C. under vacuum for a period of about 2 hours, or until evolution of methanol ceased. The product phenolate was a brown, resinous solid. This additive was incorporated with other modifying ingredients into polyvinyl chloride and formed into 0.10 inch sheets as described in Example 1. The results of the Propane Torch and NBS Smoke Chamber Tests were as follows:

TABLE III

|  | A | B | C |
|---|---|---|---|
| PVC resin (1) | 60 | 60 | 60 |
| Stabilizer (2) | — | — | — |
| Plasticizer (3) | 40 | 40 | 40 |
| Ba-phenolate | — | 2 | 5 |
| Propane Torch Test |  |  |  |
| Wt. loss, g | 0.51 | 0.51 | 0.51 |
| Char formation | melted | firm char | firm char |
| NBS Smoke Chamber Test |  |  |  |
| Wt. loss, % | 100 | 82 | 85 |
| $T_{16}$ | 0.28 | 0.30 | 0.21 |
| $T_m$ | 1.85 | 2.2 | 2.5 |
| $D_m$ | >800 | >800 | >800 |
| Char formation | none | firm char | firm char |

For Footnotes, see TABLE I

These results show the effectiveness of barium phenolate in forming firm char with resultant lower weight loss for plasticized PVC resin formulations.

The plasticized samples B and C, with 2 and 5 phr Ba phenolate, respectively, gave much lower weight losses than the control sample A and formed firm chars whereas control sample A melted. In the NBS Smoke Chamber Test, sample A was completely consumed whereas samples B and C formed firm chars. Samples B and C left a residue in this test whereas there was none for sample A. Likewise, $T_m$ was higher for samples B and C.

EXAMPLE 4

An iron (III) phenolate (i.e., a ferric phenolate) was prepared by reacting a phenolic resin with ferric nitrate [Fe(NO₃)₃·9H₂O] in a 3/1 mole ratio. In a manner similar to that of Example 2, 80.8 grams of ferric nitrate was added to 192.6 grams of molten BRZ 7541 with the same procedure and results of said example. This additive was incorporated with other modifying ingredients into polyvinyl chloride and formed into 0.10 inch sheets as described in Example 1. The results of the Propane Torch and NBS Smoke Chamber Tests were as follows:

TABLE IV

|  | A | B | C | D | E | F | G | H |
|---|---|---|---|---|---|---|---|---|
| PVC resin (1) | 100 | 100 | 100 | 100 | 100 | 60 | 60 | 60 |
| Stabilizer (2) | — | — | 2 | 2 | 2 | 2 | 2 | 2 |
| Plasticizer (3) | — | — | — | — | — | 40 | 40 | 40 |
| Fe(III) phenolate | — | 5 | — | 1 | 5 | — | 1 | 5 |
| Propane Torch Test |  |  |  |  |  |  |  |  |
| Wt. loss, g | 0.36 | 0.24 | 0.34 | 0.19 | 0.22 | 0.34 | 0.32 | 0.35 |
| Char formation | porous char | firm char | porous char | firm char | firm char | melted | firm char | firm char |
| NBS Smoke chamber test |  |  |  |  |  |  |  |  |
| Wt. loss, % | 60 | — | 80 | 60 | — | 83 | 80 | 81 |
| $T_{16}$ | 0.50 | — | 0.55 | 1.0 | — | 0.24 | 0.22 | 0.30 |
| $T_m$ | 4.15 | — | 7.3 | 7.15 | — | 2.7 | 3.25 | 3.6 |
| $D_m$ | 590 | — | 580 | 545 | — | >800 | >800 | 735 |
| Char formation | firm char | — | firm char | firm char | — | flaky char | flaky char | firm flaky char |

For Footnotes, see TABLE I

This example shows the effectiveness of iron (III) phenolates in forming firm chars with resultant lower weight loss and in suppressing smoke formation for both plasticized and non-plasticized PVC-based resin formulations. The results tabulated above show that for non-plasticized PVC, samples B, D, and E, containing 5, 1 and 5 phr Fe(III) phenolate, respectively, perform better in the Propane Torch Test than control samples A and C. Thus, they form firmer chars and show lower weight losses. In the NBS Smoke Chamber Test, samples G and H, containing 1 and 5 phr FE(III) phenolate, respectively, give lower weight losses and higher $T_m$ values as compared to control sample F.

EXAMPLE V

The iron (III) phenolate of Example IV was milled into a vinyl chloride-vinyl acetate copolymer at 110° to 120° C., and then pressed into 0.10 inch thickness sheet samples at 150° C. The results of NBS Smoke Chamber Tests were as follows:

TABLE V

|  | A | B |
|---|---|---|
| VC copolymer resin (1) | 100 | 100 |
| Fe(III) phenolate | — | 2 |
| NBS Smoke Chamber Test |  |  |
| Wt. loss, % | 61 | 51 |
| $T_{16}$ | 0.32 | 0.50 |
| $T_m$ | 2.05 | 5.35 |
| $D_m$ | 315 | 460 |
| Char formation | firm char | firm char |

(1) vinylchloride-vinyl acetate copolymer containing 14% vinyl acetate. VYHD, Union Carbide Corporation This example shows the effectiveness of iron (III) phenolate with vinyl-chloride copolymers in lowering weight loss and suppressing smoke formation in a fire situation. Thus, sample B, with 2 phr Fe(III) phenolate, shows a lower weight loss and higher $T_m$ value as compared to control sample A in the NBS Smoke Chamber Test.

We claim:

1. A thermoplastic vinyl halide resin composition having good fire resistance, said composition comprising a vinyl halide resin admixed with from about 1 to 10 weight percent, based on the weight of the vinyl halide resin, of the reaction product of a polyvalent metal selected from the group consisting of cupric copper and metals of groups II, IV and VIII of the Periodic Table with an excess of a thermoplastic phenolaldehyde resin of the novolac type, the ratio of phenolic hydroxyl groups of the said phenol-aldehyde resin to the valencies of the polyvalent metal being from about 1.5 to about 4.5, whereby the said salt contains reactive phenolic hydroxy groups as well as salt linkages wherein the hydrogen of a phenolic hydroxy group is replaced by a valency of the said metal; said phenol-aldehyde resin having the structure

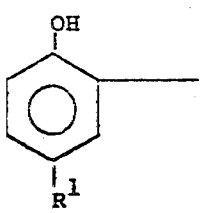

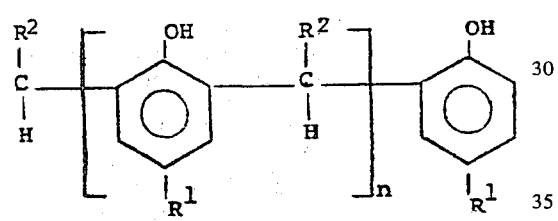

where $n$ is a small number having an average value of from about 1 to 4, $R^1$ represents hydrogen, halogen or an alkyl group, and $R^2$ represents hydrogen or a $C_1 - C_3$ alkyl group.

2. The composition of claim 1 wherein the polyvalent metal is zinc.

3. The composition of claim 1 wherein the polyvalent metal is cupric copper.

4. The composition of claim 1 wherein the polyvalent metal is barium.

5. The composition of claim 1 wherein the polyvalent metal is ferric iron.

6. The method of improving the fire resistance of a thermoplastic vinyl halide resin composition which comprises introducing into said composition from about 1 to 10 weight percent, based on the weight of the vinyl halide resin, of the reaction product of a polyvalent metal selected from the group consisting of cupric copper and metals of groups II, IV and VIII of the Periodic Table with an excess of a thermoplastic phenol-aldehyde resin of the novolac type, the ratio of phenolic hydroxyl groups of the said phenol-aldehyde resin to the valencies of the polyvalent metal being from about 1.5 to about 4.5, whereby the said salt contains reactive phenolic hydroxy groups as well as salt linkages wherein the hydrogen of a phenolic hydroxy group is replaced by a valency of the said metal, said phenol-aldehyde resin having the structure

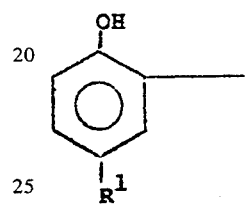

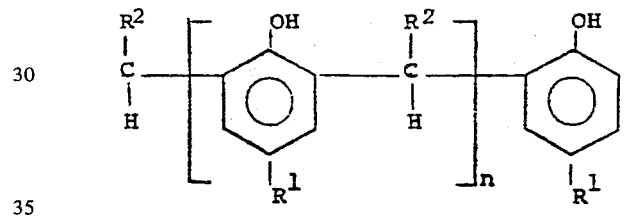

where $n$ is a small number having an average value of from about 1 to 4, $R^1$ represents hydrogen, halogen or an alkyl group, and $R^2$ represents hydrogen or a $C_1 - C_3$ alkyl group.

7. The method of claim 6 wherein the polyvalent metal is zinc.

8. The method of claim 6 wherein the polyvalent metal is cupric copper.

9. The method of claim 6 wherein the polyvalent metal is barium.

10. The method of claim 6 wherein the polyvalent metal is ferric iron.

* * * * *